US008608304B2

(12) United States Patent
Takaori et al.

(10) Patent No.: US 8,608,304 B2
(45) Date of Patent: Dec. 17, 2013

(54) PROCESS FOR FORMING IMAGE BY INK JET RECORDING APPARATUS

(75) Inventors: Yasuko Takaori, Osaka (JP); Noriaki Furukawa, Osaka (JP); Noriaki Ozawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/556,557

(22) Filed: Jul. 24, 2012

(65) Prior Publication Data

US 2013/0027464 A1 Jan. 31, 2013

(30) Foreign Application Priority Data

Jul. 26, 2011 (JP) ................................ 2011-163486

(51) Int. Cl.
*B41J 2/17* (2006.01)
*C09D 11/00* (2006.01)

(52) U.S. Cl.
USPC ........ 347/95; 347/100; 106/31.28; 106/31.65

(58) Field of Classification Search
USPC ........... 347/21, 84, 92, 100; 106/31.28, 31.65
See application file for complete search history.

(56) References Cited

U.S. PATENT DOCUMENTS

| | | | | |
|---|---|---|---|---|
| 6,186,615 | B1 | 2/2001 | Sato et al. | |
| 7,892,340 | B2 * | 2/2011 | Namba et al. | 106/31.89 |
| 2005/0231575 | A1 * | 10/2005 | Bannai et al. | 347/100 |

FOREIGN PATENT DOCUMENTS

| | | | |
|---|---|---|---|
| JP | 6-136310 | A | 5/1994 |
| JP | 6-226999 | A | 8/1994 |
| JP | 2005-220218 | A | 8/2005 |
| JP | 2007-145927 | A | 6/2007 |

* cited by examiner

*Primary Examiner* — Matthew Luu
*Assistant Examiner* — Alexander D Shenderov

(57) ABSTRACT

A process for forming an image by using an inkjet recording apparatus including printing by using two or more kinds of inks each containing a pigment dispersion containing a pigment and a resin, an organic solvent and water, wherein the printing is conducted by ejecting the inks each having a particle size-change constant within a prescribed range from recording heads in the increasing order of the particle size-change constants, wherein each particle size-change constant is obtained by a prescribed process from the average particle diameters of the pigment included in each ink at mass drying rates in the range of 10 to 40%.

4 Claims, 5 Drawing Sheets

PROCESS FOR FORMING IMAGE BY INK JET RECORDING APPARATUS

INCORPORATION BY REFERENCE

This application is based on and claims the benefit of priority from Japanese Patent Application No. 2011-163486, filed on 26 Jul. 2011, the content of which is incorporated herein by reference.

FIELD

The present disclosure relates to a process for forming an image by an inkjet recording apparatus using two or more colors of inks.

BACKGROUND

In recent years, inkjet recording apparatuses that form images by an inkjet recording system are widely used as image forming apparatuses since high-definition image qualities that are comparable to those of silver halide photographs can be obtained due to rapid advances in recording technologies.

In such process for forming an image using an inkjet recording apparatus, image formation at a desired image density, high-speed printing, suppression of strike-through (a phenomenon in which a printed ink passes through a recording medium and the formed image is seen from the rear surface) during printing, suppression of color bleeding between inks having different colors, and suppression of occurrence of image pollution due to offset, and the like are required, and various studies have been done in order to solve these problems.

For example, in order to solve the problem of strike-through, suggested is use of an inkjet ink that is characterized by that, when the Bristow measurement is conducted for a plane paper and the measured values are plotted, the plots show liquid transition amounts L (ml/$m^2$) as a vertical axis and $(\gamma\cdot t/\eta)^{1/2}$ as a horizontal axis, the value of the gradient of the graph is less than 0 to 0.9-fold of the value of a gradient when pentadecane is used as a measurement liquid. $\gamma$ shows the surface tension (mN/m) of the inkjet ink, t shows the contact time (msec), and $\eta$ shows viscosity (mPa·sec).

However, in the case when an image is formed by the above-mentioned inkjet ink, the problem of strike-through is solved, but the penetration of the inkjet ink into the recording medium may be suppressed in order to solve such problem. Therefore, the problems of suppression of color bleeding and occurrence of image pollution due to offset are not solved even by the above-mentioned inkjet ink. Furthermore, in the process for forming an image using the above-mentioned inkjet ink, printing is conducted at a high-speed in many cases when an inkjet recording apparatus of a line head system is used, and thus color bleeding and occurrence of image pollution due to offset may be significant.

It is considered that it is effective for suppressing color bleeding to form an image by ejecting inks of two or more colors in the decreasing order of the penetrabilities of the inks into a recording medium, and for example, the following processes for forming an image have been suggested. Specifically, a process for forming an image by ejecting inks in the decreasing order of the contents of a penetrability imparting agent, and a process for forming an image by ejecting color inks each having a fast penetration velocity into a recording medium prior to the ejection of a black ink having a slow penetration velocity have been suggested.

Furthermore, as a process for suppressing strike-through and color bleeding when an image is formed by an inkjet recording apparatus of a line head system, a process including forming an image by ejecting inks each containing an organic solvent having an SP value in a specific range which provides an ink transition amount after 0.05 seconds of a contact time by the Bristow method of 15 ml/$m^2$ or more in the decreasing order of the ink transition amounts is exemplified.

However, the penetrabilities of the inks which are considered in the above-mentioned processes for forming an image including ejecting inks of two or more colors in the decreasing order of the penetrabilies into the recording medium are the penetrabilities of the inks into the recording medium from 10 seconds after the printing. Therefore, in these processes for forming an image, color bleeding cannot be suppressed sufficiently by an inkjet recording apparatus of a line head system by which high-speed printing is conducted, for example, under such a condition that the ejection interval of the inks between the adjacent line heads becomes 1 second or less.

Furthermore, in the above-mentioned process for forming an image in which strike-through and color bleeding are suppressed when an image is formed by an inkjet recording apparatus of a line head system, the effect of suppressing strike-through is not sufficient, and thus further improvement is demanded. In addition, in this process for forming an image, since inks having excellent penetrabilities into a recording medium are used, the pigments included in the inks easily enter the inside of the recording medium in accordance with the penetration of the inks. Therefore, an image having a desired image density is difficult to be formed in this process.

Furthermore, the above-mentioned four conventional image forming processes do not consider suppression of image pollution due to offset which occurs by rubbing of a formed image by a roller disposed on an ejection unit when the recording medium on which the image has been formed is discharged from the inkjet recording apparatus. Therefore, in these image forming processes, image pollution due to offset may easily occur depending on the compositions of the inks.

SUMMARY

The present disclosure has been made under such circumstance, and aims at providing a process for forming an image by which an image having a desired image density can be formed while suppressing strike-through during printing, color bleeding between inks having different colors and occurrence of image pollution due to offset even in the case when printing is conducted at a high-speed by using an inkjet recording apparatus of a line head system.

The process for forming an image of the present disclosure is a process for forming an image by an inkjet recording apparatus including printing by using two or more kinds of inks each containing a pigment dispersion containing a pigment and a resin, an organic solvent and water, wherein each ink has a particle size-change constant of 50 to 150, wherein the particle size-change constant is obtained as the gradient of an approximate straight line that is obtained by plotting the values of the average particle diameters of the pigment included in the ink at mass drying rates in the range of 10 to 40% on an XY plane including an X axis relating to the mass drying rates and a Y axis relating to the average particle diameters of the pigment, and linear-approximating the plotted values, and the printing is conducted by ejecting the inks from recording heads in the increasing order of the particle size-change constants of the inks.

BRIEF DESCRIPTION OF THE DRAWINGS

FIG. 5 is a graph showing the relationship between the mass drying rates and the average particle diameters (D50) of the pigment included in the ink of the ink a.

DETAILED DESCRIPTION OF EMBODIMENTS

Figure 1:
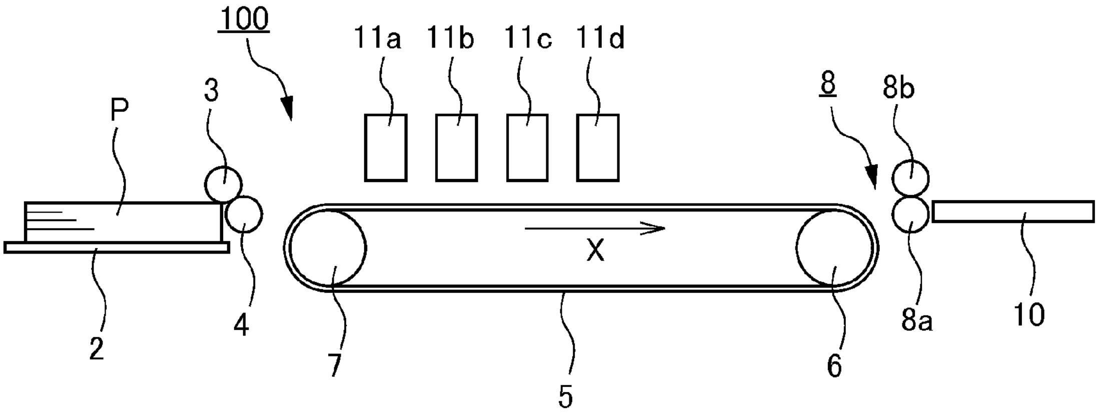
FIG. 1 is a cross-sectional view showing the structure of an inkjet recording apparatus including a line head-type recording system.

Hereinafter exemplary embodiments of the present disclosure are explained in detail, but the present disclosure is not limited at all to the following exemplary embodiments and may be carried out with appropriately making a change suitably within the scope of the object of the present disclosure. For some parts on which explanations are overlapped, one of the explanations is suitably omitted, which is not construed to limit the gist of the disclosure.

The process for forming an image of the present disclosure is a process for forming an image including printing by using two or more kinds of inks each containing a pigment dispersion containing a pigment and a resin, an organic solvent and water, wherein the image is formed by ejecting the inks from recording heads in the increasing order of the particle size-change constants of the inks mentioned below. Hereinafter the inks, the processes for preparing the inks, and the process for forming an image are explained in order with respect to the present disclosure.

[Inks]

The inks used in the present disclosure essentially include a pigment dispersion containing a pigment and a resin, water and an organic solvent. Furthermore, the inks used in the present disclosure may include, as necessary, a dissolution stabilizer for stabilizing the dissolution state of the components included in the ink, and a moisturizing agent for stabilizing the viscosity of the ink by suppressing the volatilization of the liquid components from the ink. Hereinafter the pigment dispersion, water, organic solvent, dissolution stabilizer and moisturizing agent are explained in order with respect to the inks used in the present disclosure.

In the present disclosure, inks of two or more colors are used. The number of the inks is not specifically limited as long as it is two or more, within a scope in which the object of the present disclosure is not inhibited. It is preferable to use inks of four colors including a black ink, a cyan ink, a yellow ink and a magenta ink since images having various hues can be formed finely, the number of recording heads is decreased and the inkjet recording apparatus is easy to be miniaturized.

(Pigment Dispersion)

The pigment that can be incorporated in the pigment dispersion is not specifically limited within a scope in which the object of the present disclosure is not inhibited, and can be selected from pigments that have been conventionally used as colorants of inks for an inkjet recording apparatus, and used. Specific examples of the pigment used in the cyan ink may include blue pigments such as C. I. Pigment Blue, specific examples of the pigment used in the yellow ink may include yellow pigments such as C. I. Pigment yellow 74, 93, 95, 109, 110, 120, 128, 138, 139, 151, 154, 155, 173, 180, 185 and 193, specific examples of the pigment used in the magenta ink may include red pigments such as C. I. Pigment Red 122 and 202, and specific examples of the pigment used in the black ink may include black pigments such as C. I. Pigment Black 7 (B.K-7, carbon black).

Specific examples of pigments having hues other than the above-mentioned hues may include orange pigments such as C. I. Pigment Orange 34, 36, 43, 61, 63 and 71, purple pigments such as C. I. Pigment Violet 19, 23 and 33, and the like. The hue of the ink can be adjusted to a desired hue by using two or more kinds of these pigments in combination.

The amount of the pigment included in the ink is not specifically limited within a scope in which the object of the present disclosure is not inhibited. Typically, it is preferably 2 to 15% by mass, more preferably 4 to 10% by mass with respect to the total mass of the ink. When the used amount of the pigment is excessively small, an image having a desired image density may be difficult to be formed. When the used amount of the pigment is excessively large, it may become difficult to form a fine image due to lack of the fluidity of the ink, or offset may easily occur due to lack of the penetrability of the ink into the recording medium. Furthermore, in some cases when the used amount of the pigment is too large, the disperse stability of the ink cannot be maintained.

The resin included in the pigment dispersion is not specifically limited within a scope in which the object of the present disclosure is not inhibited, and can suitably be selected from various resins that have been conventionally used in the production of pigment dispersions and used. Specific examples of preferable resins may include styrene-acrylic acid-alkyl acrylate ester copolymers, styrene-acrylic acid copolymers, styrene-maleic acid copolymers, styrene-maleic acid-alkyl acrylate ester copolymers, styrene-methacrylic acid copolymers, styrene-alkyl methacrylate ester copolymers, styrene-maleic acid half ester copolymers, vinylnaphthalene-acrylic acid copolymers, vinylnaphthalene-maleic acid copolymers and the like. Among these resins, styrene-acrylic resins including units derived from styrene and units derived from acrylic acid, methacrylic acid, an acrylic acid ester or a methacrylic acid ester such as styrene-acrylic acid-alkyl acrylate ester copolymers, styrene-acrylic acid copolymers, styrene-maleic acid-alkyl acrylate ester copolymers, styrene-methacrylic acid copolymers and styrene-alkyl methacrylate ester copolymers are preferable since they are prepared easily and are excellent in effect of dispersing pigments. The above-mentioned resins are obtained by radical polymerization.

The weight average molecular weight (Mw) of the resin used in the preparation of the pigment dispersion is not specifically limited within a scope in which the object of the present disclosure is not inhibited. And typically, the weight average molecular weight of the resin is preferably from 30,000 to 200,000. In the case when the weight average molecular weight (Mw) of the resin is adjusted to a value within such range, it is easy to adjust the values of the particle size-change constants of the inks mentioned below to a range of 50 to 150. The weight average molecular weight (Mw) of the resin included in the pigment dispersion can be measured by gel filtration chromatography.

In the present disclosure, the order of ejection of the inks during formation of an image is determined by the particle size-change constants of the inks mentioned below, and the particle size-change constants of the inks can be adjusted by modifying the weight average molecular weight (Mw) of the resin when the pigment dispersion is prepared. Specifically, the higher the weight average molecular weight (Mw) of the resin included in the pigment dispersion is, the larger the particle size-change constant of the obtained ink is.

The used amount of the resin in the preparation of the pigment dispersion is not specifically limited within a scope in which the object of the present disclosure is not inhibited. A typical used amount of the resin is preferably 30 to 100 parts by mass and more preferably 30 to 70 parts by mass with respect to 100 parts by mass of the pigment.

The process for producing the pigment dispersion containing the pigment and resin is not specifically limited within a scope in which the object of the present disclosure is not inhibited, and can suitably be selected from conventionally-known methods. An example of a preferable method may include a method including kneading a pigment and a resin in a medium of a suitable liquid such as water to form a pigment dispersion by using a media-type wet dispersing machine such as a Nano Grain Mill (manufactured by Asada Tekko), an MSC Mill (manufactured by Mitsui Mining Co., Ltd.), a Dyno Mill (manufactured by Shinmaru Enterprises Corporation) and a sand mill (manufactured by Yasukawa Seisakusho Co., Ltd.). In a treatment by the media-type wet dispersing machine, beads each having a small particle size are used. The particle size of the beads is not specifically limited, and is typically a particle size of 0.5 to 2.0 mm. Furthermore, the material of the beads is not specifically limited, and a hard material such as zirconia and glass is used.

(Water)

The ink used in the present disclosure is an aqueous ink that essentially includes water. The water included in the ink is not specifically limited within a scope in which the object of the present disclosure is not inhibited, and water having a desired purity can suitably be selected from waters that have been conventionally used in the production of aqueous inks and used. The content of the water in the ink is not specifically limited within a scope in which the object of the present disclosure is not inhibited. The content of the water is suitably changed in accordance with the used amount of the other components mentioned below. A typical content of the water in the ink is preferably from 20 to 70% by mass, more preferably from 30 to 60% by mass with respect to the total mass of the ink.

(Organic Solvent)

The ink used in the present disclosure essentially includes an organic solvent for the purposes of promotion of the penetration of the ink into the recording medium, and the like. Specific examples of preferable organic solvents may include alkylene glycol monoalkyl ethers such as ethylene glycol monobutyl ether, triethylene glycol monomethyl ether, triethylene glycol monobutyl ether, diethylene glycol monomethyl ether and ethylene glycol monomethyl ether, 1,2-alkanediols having 6 to 8 carbon atoms such as 1,2-hexylene glycol, and the like. These organic solvents may be used alone by one kind, or as a combination of two or more kinds. The content of the organic solvent in the ink is preferably 10 to 60% by mass, more preferably 20 to 50% by mass with respect to the total mass of the ink.

(Dissolution Stabilizer)

The dissolution stabilizer is a component that compatibilizes the components included in the ink to stabilize the dissolution state of the ink. Specific examples of the dissolution stabilizer may include 2-pyrrolidone, N-methyl-2-pyrrolidone and γ-butyrolactone, and the like. These dissolution stabilizers may be used by combining two or more kinds. In the case when the ink includes the dissolution stabilizer, the content of the dissolution stabilizer is preferably 1 to 20% by mass, more preferably 3 to 15% by mass with respect to the total mass of the ink.

(Moisturizing Agent)

The moisturizing agent is a component that stabilizes the viscosity of the ink by suppressing the volatilization of the liquid components from the ink. Specific examples of the moisturizing agent may include polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, glycerin and the like. Among these moisturizing agents, glycerin is more preferable since glycerin is excellent in effect of suppressing the volatilization of liquid components such as water. Two or more kinds of moisturizing agents can be used in combination. In the case when the ink includes the moisturizing agent, the content of the moisturizing agent is preferably 5 to 50% by mass, more preferably 10 to 40% by mass with respect to the total mass of the ink.

The particle size-change constant of the ink can also be adjusted by modifying the content of the moisturizing agent. Specifically, the higher the content of the moisturizing agent in the ink is, the larger the particle size-change constant of the ink is.

[Process for Production of Ink]

The process for the production of the ink is not specifically limited as long as the ink components such as the pigment dispersion, water and organic solvent can be mixed homogeneously. A specific example of the method for the production of the ink for an inkjet recording apparatus may include a method including homogeneously mixing the respective components for the ink by a mixer, and removing contaminants and coarse particles by a filter having a pore diameter of 10 μm or less. When the ink is produced, components such as a dissolution stabilizer and a moisturizing agent, as well as various additives that have been conventionally added to inks for an inkjet recording apparatus such as a surfactant, an antioxidant, a viscosity adjusting agent, a pH adjusting agent, an antisepsis/antifungal agent can be added as necessary.

[Process for Forming Image]

Although the inkjet recording apparatus used in the process for forming an image of the present disclosure is not specifically limited, it is preferable to use an inkjet recording apparatus of a line head system as the inkjet recording apparatus since a high quality image can be formed at a high-speed. In an inkjet recording apparatus of a line head system, image pollution due to offset and color bleeding may occur easily, whereas these problems are difficult to occur by using the process for forming an image of the present disclosure.

Furthermore, in the case when an image is formed by using an inkjet recording apparatus of a line head system, the printing velocity is preferably 100 ppm (page/min) or more as a printing velocity in the case when printing is conducted by conveying a recording medium of A4 (portrait) size. By using process for forming an image of the present disclosure, even in the case when an image is formed at a high-speed of 100 ppm or more, an image having a desired image density can be formed without problems of strike-through, color bleeding and pollution due to offset.

Figure 2:
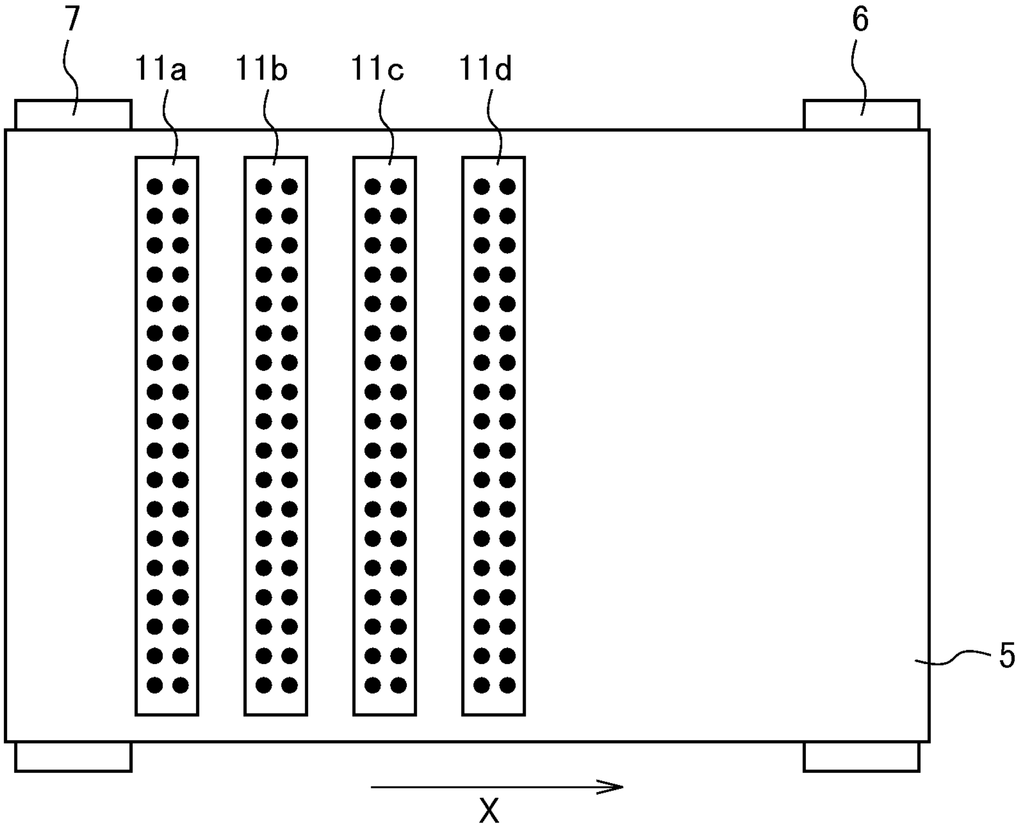
FIG. 2 is a plane view in which the conveyor belt of the inkjet recording apparatus shown in FIG. 1 is seen from the upper side.

Hereinafter the case when an image is formed by using an inkjet recording apparatus of a line head type including four recording heads, using a recording paper as a recording medium, and using a black ink, a cyan ink, a magenta ink and a yellow ink is explained as a preferable example of the process for forming an image of the present disclosure, with referring to drawings. FIG. 1 is a cross-sectional view showing the structure of an inkjet recording apparatus of a line head-type recording system, and FIG. 2 is a plane view in which the conveyor belt of the inkjet recording apparatus shown in FIG. 1 is seen from the upper side.

As shown in FIG. 1, a paper feeding tray 2 for housing a recording paper P is disposed on the left side part of an inkjet recording apparatus 100. On one end of the paper feeding tray 2 are disposed a paper feeding roller 3 that is configured to convey and feed the housed recording paper P sequentially sheet by sheet from the uppermost recording paper P to a conveyor belt 5 mentioned below, and a driven roller 4 that is pressure-contacted with the paper feeding roller 3, and is rotated by the paper feeding roller 3.

A conveyor belt 5 was disposed rotatably on the downstream side in the paper conveying direction (the right side in FIG. 1) of the paper feeding roller 3 and follower roller 4. The conveyor belt 5 is disposed over a belt driving roller 6 that is disposed on the downstream side of the paper conveying direction and a belt roller 7 that is disposed on the upper stream side which is rotated by the belt driving roller 6 through the conveyor belt 5. The recording paper P is conveyed in the direction of the arrow X by the rotation driving of the belt driving roller 6 in a clockwise direction.

Since the belt driving roller 6 is disposed on the downstream side of the paper conveying direction, the paper feeding side of the conveyor belt 5 (the upper side in FIG. 1) is pulled by the belt driving roller 6. Thus, the belt can be stretched without slack, and stable conveyance of the recording paper P becomes possible. A sheet made of a dielectric resin is used for the conveyor belt 5, and a belt without seams (seamless belt) or the like is preferably used as the conveyor belt 5.

Furthermore, an ejection roller 8*a* and a driven roller 8*b* are provided on the downstream side of the transporting belt 5 in the sheet-transporting direction. The ejection roller 8*a* is driven in a clockwise direction in the drawing to eject the recording paper P, on which an image has been recorded, to the outside of the main body of the apparatus. The driven roller 8*b* pressure-contacts with the upper part of the ejection roller 8*a* and is rotated by the ejection roller 8*a*. A paper ejection tray 10, on which the recording papers P that has been ejected to the outside of the main body of the apparatus are stacked, is disposed on the downstream side of the ejection roller 8*a* and driven roller 8*b*.

Since the driven roller 8*b* directly contacts with the printed surface, the material that forms the surface of the driven roller 8*b* is preferably a water repelling material. By forming the surface of the driven roller 8*b* by using the water repelling material, the adhesion of the ink, that has not penetrated into the recording paper P, to the driven roller 8*b* can be suppressed, which makes suppression of the occurrence of offset easy. Examples of preferable water repelling materials may include fluorine resins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, polychlorotrifluoroethylene, chlorotrifluoroethylene-ethylene copolymers, chlorotrifluoroethylene-vinylidene fluoride copolymers, polyvinylidene fluoride and polyvinyl fluoride. Similarly to the driven roller 8*b*, it is preferable that the surfaces of elements to be contacted with the printed surface are formed by a water repelling material.

Furthermore, line heads 11*a*, 11*b*, 11*c* and 11*d* that are configured to record an image on the recording paper P conveyed on the conveyor belt 5 are disposed on the upper side of the conveyor belt 5. The line heads 11*a*, 11*b*, 11*c* and 11*d* are supported at such a height that a predetermined interval is formed against the upper surface of the conveyor belt 5. The line heads 11*a*, 11*b*, 11*c* and 11*d* are filled with inks of four colors each having a particle size-change constant of the ink measured according to the following process of 50 to 150 are filled sequentially from the line head 11*a* in the increasing order of the particle size-change constants.

(Measurement of Mass Drying Rate)

About 250 ml of an ink is poured into a columnar container having a volume of 300 ml and an opening on the top, and the mass of the ink (initial mass) $W^1$ in the container is measured. The container of the ink is then put into a constant-temperature bath whose internal temperature is set to 60° C., and the mass of the ink $W^2$ in the container is measured at every time that is optionally set. The mass drying rate of the ink calculated by the following formula is measured as needed, and the average particle diameter of the pigment included in the ink is measured according to the following process at the timepoints when the mass drying rate becomes 10% by mass, 20% by mass, 30% by mass and 40% by mass, respectively.

$$\text{Mass drying rate }(\%)=((W^1-W^2)/W^1)\times 100$$

(Measurement of Average Particle Diameters of Pigment)

The average particle diameters of the pigment included in the ink are measured at the timepoints when the mass drying rate becomes 10% by mass, 20% by mass, 30% by mass and 40% by mass, respectively. The average particle diameters are measured by using Zetasizer Nano ZS (manufactured by Malvern) at 25° C. The obtained median diameters (D50) of the pigment are used as average particle diameters.

(Process for Measuring Particle Size-Change Constant)

The values of the average particle diameters of the pigment included in the ink at the timepoints when the mass drying rate becomes 10% by mass, 20% by mass, 30% by mass and 40% by mass, respectively, are plotted on an XY plane having a horizontal axis (X axis) that relates to the mass drying rates of the ink and a vertical axis (Y axis) that relates to the average particle diameters of the pigment included in the ink by using Microsoft (registered trademark) Excel (registered trademark) (manufactured by Microsoft). When plotting the data, in the case when the mass drying rate is 10%, it is plotted as 0.10, and in the case when the mass drying rate is 40% by mass, it is plotted as 0.40. After plotting of the data, an approximate straight line is obtained by conducting linear-approximating based on the data in the range of the mass drying rates of 10, 20, 30 and 40% by mass. For the obtained approximate straight line, an approximate equation represented by Y=AX+B (A and B are constants) is acquired, and A as the gradient of the approximate straight line is considered as a particle size-change constant.

By adjusting the particle size-change constant of the ink to 50 or more, the average particle diameter of the pigment included in the ink can be adjusted to a suitable size during image formation. Therefore, the liquid components included in the ink can penetrate into the recording medium in the state that the pigment remains on the surface of the recording medium, thereby occurrence of strike-through can be suppressed.

Furthermore, the pigment particles are difficult to become coarse between fibers constituting the recording medium, and the penetration of the liquid components included in the ink into the recording medium becomes difficult to be inhibited, by adjusting the particle size-change constant of the ink to 150 or less. Therefore, the liquid components included in the ink can finely penetrate into the recording medium, thereby occurrence of image pollution due to offset can be suppressed in all of the inks ejected from the line heads 11_a_ to 11_d_.

Furthermore, occurrence of color bleeding can be suppressed by ejecting the inks of four colors in order from the line head 11_a_ in the increasing order of the particle size-change constants. The smaller the particle size-change constant is, the more difficult the generation of coarse pigment particles between fibers constituting the recording medium is after the landing of the ink droplets on the recording medium, and thus the easier the quick penetration of the liquid components included in the ink into the recording medium is. In this case, after the pigment included in the ink of the early order of printing is fixed to some extent on the surface of the recording medium, the ink of the next order easily lands on the surface of the recording medium. Therefore, the ink of the early order of printing and the ink of the next order are difficult to be mixed on the surface of the recording medium, and thus occurrence of color bleeding is suppressed.

The difference in the particle size-change constants between the ink of the early order of printing and the ink of the next order is not specifically limited within a scope in which the purpose of the present disclosure is not inhibited. Typically, the difference in the particle size-change constants between the ink of the early order of printing and the ink of the next order is preferably 10 to 50. If the difference in the particle size-change constants between the ink of the early order of printing and the ink of the next order is too small, a desired effect of suppressing color bleeding may be difficult to be obtained. If the difference in the particle size-change constants between the ink of the early order of printing and the ink of the next order is too high, the particle size-change constant of the ink of the later order of printing becomes too high, which may cause slight image pollution due to offset.

Therefore, it is more preferable that the particle size-change constant of the ink ejected in the first order is 50 to 80. By adjusting the particle size-change constant of the ink ejected in the first order to such range, the difference in the particle size-change constants between the ink of the early order of printing and the ink of the next order is adjusted to a range of 10 to 50, thereby an image is formed easily.

As shown in FIG. 2, these line heads 11_a_ to 11_d_ include nozzle arrays each including plural nozzles arranged in the direction orthogonal to the convey direction of the recording paper P (the vertical direction in FIG. 2) and has a recording area having a width equal to or more than the width of the recording paper P as conveyed, which enables recording of an image for one line all at once on the recording paper P being conveyed on the conveyor belt 5.

Although the inkjet recording apparatus of a line head-type recording system uses a line head that is configured to have a recording area having a width equal to or more than the width of the recording paper P by arranging the plural nozzles in the longitudinal direction of the main body of a long head formed to have width and size equal to or more than those of the conveyor belt 5. Alternatively, for example, a line head that has been made possible to record an image over the whole width in the width direction of the recording paper P being conveyed, by arranging plural short head units each including plural nozzles in the width direction of the conveyor belt 5 may also be used.

Furthermore, as the system for ejecting the inks from the line heads 11_a_ to 11_d_, various systems such as a piezoelectric element system in which droplets of inks are ejected by utilizing pressures generated in the liquid chambers of the line heads 11_a_ to 11_d_ by using piezoelectric elements (piezo elements) that are not depicted, and a thermal inkjet system in which inks are ejected by applying a pressure by generating air bubbles by a heat generator can be applied. The system for ejecting the inks is preferably a piezoelectric element system since ejection amounts can be controlled easily.

Figure 3:
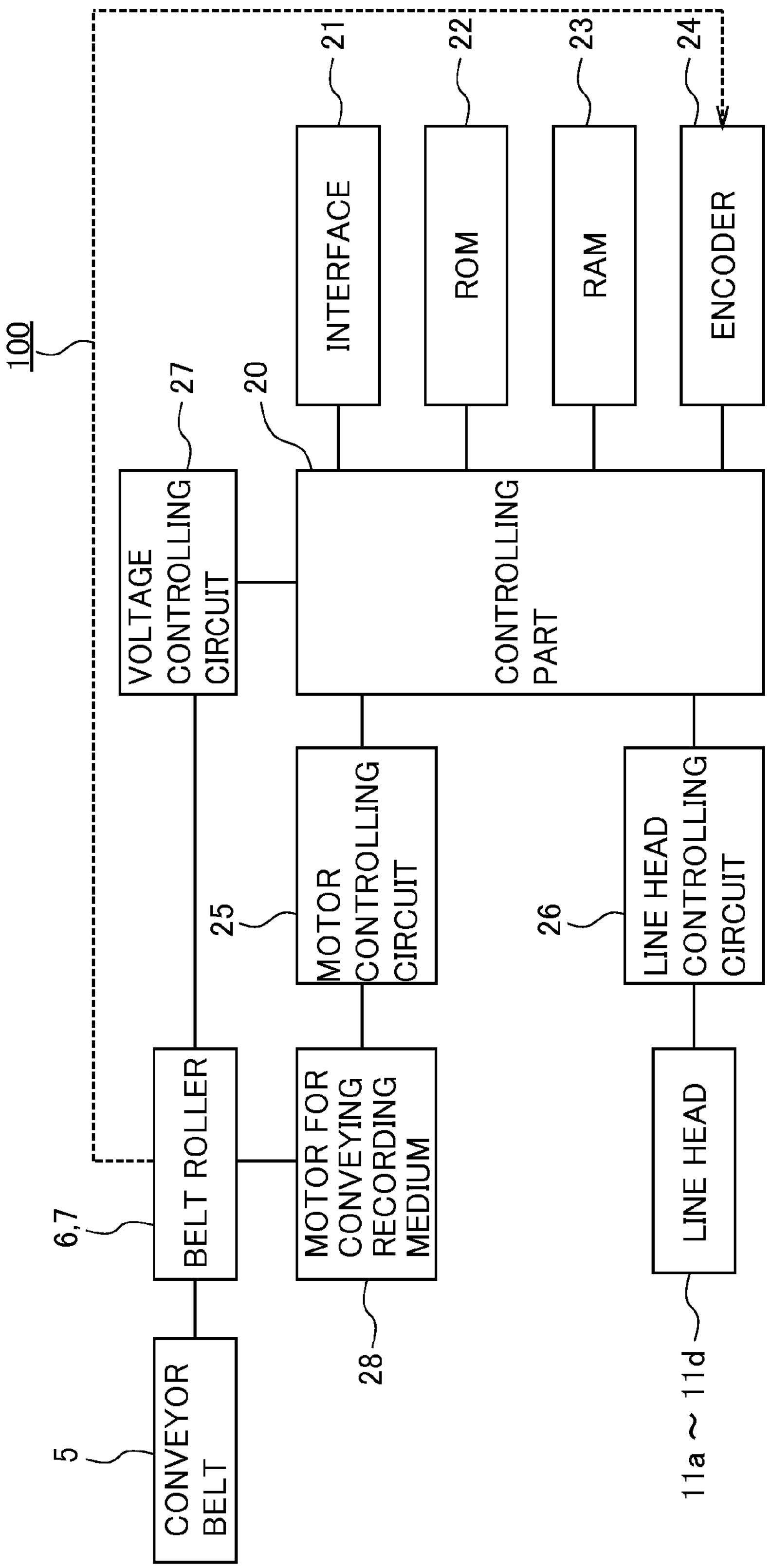
FIG. 3 is a block diagram showing the structure of an inkjet recording apparatus including a line head-type recording system.

FIG. 3 is a block diagram showing the structure of the inkjet recording apparatus of a line head-type recording system. Identical symbols are provided to the parts common with those of FIG. 1 and FIG. 2, and the explanations thereon are not repeated. The inkjet recording apparatus 100 includes a controlling part 20. An interface 21, a ROM 22, a RAM 23, an encoder 24, a motor controlling circuit 25, a line head controlling circuit 26 and a voltage controlling circuit 27, and the like are connected to the controlling part 20.

The interface 21 sends data to, for example, a host apparatus that is not depicted such as a personal computer, or receives data therefrom. The controlling part 20 subjects an image signal that has been received via the interface 21 to a magnification-changing processing or a gradation processing as necessary to convert the image signal to image data. The controlling part 20 then outputs controlling signals to various controlling circuits mentioned below.

The ROM 22 stores a controlling program and the like when an image is recorded by driving line heads 11_a_ to 11_d_. The RAM 23 stores the image data that has undergone the magnification-changing processing or gradation processing by the controlling part 20 in a predetermined area.

The encoder 24 is connected to the belt driving roller 6 at the paper ejection side which drives the conveyor belt 5, and outputs a pulse array depending on the amount of the rotation-displacement amount of the rotation axis of the belt driving roller 6. The controlling part 20 calculates the amount of rotation by counting the number of pulses sent by the encoder 24 to figure out the feeding amount of the paper (the paper position). Furthermore, the controlling part 20 outputs controlling signals to the motor controlling circuit 25 and a line head controlling circuit 26 based on signals from the encoder 24.

The motor controlling circuit 25 drives a motor 28 for conveying the recording medium based on the signal output from the controlling part 20. The motor 28 for conveying the recording medium is driven to rotate the belt driving roller 6 and rotate the conveyor belt 5 in a clockwise direction in FIG. 1 to convey the paper in the direction of the arrow X.

The line head controlling circuit 26 transfers the image data stored in the RAM 23 to the line heads 11C to 11K based on the signal output from the controlling part 20 and controls the ejection of the inks from the line heads 11C to 11K based on the transferred image data. The process for recording on the paper is conducted by such control, and the control of the conveyance of the recording paper P by the conveyor belt 5 that is driven by the motor 28 for conveying the recording medium.

The voltage controlling circuit 27 causes an alternating electric field by applying a voltage to the belt roller 7 at the paper feeding side based on the signal output from the controlling part 20, thereby the recording paper P is statically attracted by the conveyor belt 5. The static attraction is deactivated by grounding the belt roller 7 or belt driving roller 6 based on the signal output by the controlling part 20. Although a structure in which a voltage is applied to the belt roller 7 at the paper feeding side is shown here, a structure in which a voltage is applied to the belt driving roller 6 at the paper ejection side may also be used.

Figure 4:
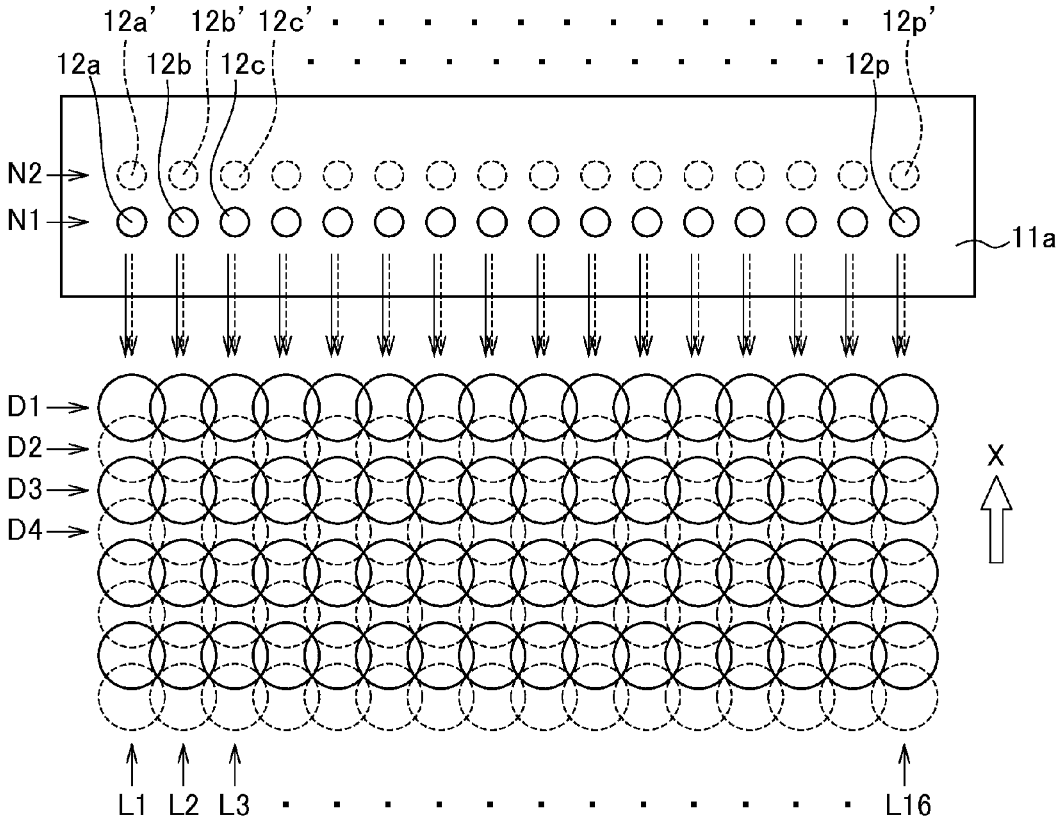
FIG. 4 is a plane view showing a line head that is used for an inkjet recording apparatus including a line head-type recording system, and a part of dot arrays formed on a recording paper.

A method for forming dots by using an inkjet recording apparatus of line head-type recording system is specifically explained by using FIG. 4. Among the line heads 11_a_ to 11_d_ shown in FIG. 1 and FIG. 2, the line head 11C is explained as an example in FIG. 4, but the same explanation also applies to the other line heads 11*b* to 11*d*.

As shown in FIG. 4, nozzle arrays N1 and N2 each including plural nozzles are disposed in parallel in the convey direction (the direction of the arrow X) in the line head 11*a*. Namely, the nozzle arrays N1 and N2 each has one nozzle, i.e., the nozzle arrays have two nozzles in total (for example, a dot array L1 has nozzles 12*a* and 12*a*'), as nozzles for forming respective dot arrays in the convey direction. For the convenience of the explanation, only respective 16 nozzles for 12*a* to 12*p* and 12*a*' to 12*p*' that correspond to the dot arrays L1 to L16 are described among the nozzles that constitute the nozzle arrays N1 and N2, but a larger number of nozzles are actually arranged in the direction orthogonal to the convey direction.

Furthermore, using the nozzle arrays N1 and N2 sequentially, an image is formed on the recording paper P as a recording medium. For example, a dot array D1 corresponding to for one line in the width direction (the horizontal direction in the drawing) is formed by the ejection of the ink from the nozzle array N1 (the solid arrows in the drawing), thereafter a dot array D2 corresponding to the next one line is formed by the ejection of the ink from the nozzle array N2 (the dashed arrows in the drawing), and a dot array D3 corresponding to the next one line is formed by the ejection of the ink from the nozzle array N1 again, while the recording paper P is conveyed to the convey direction of the recording paper P. A dot array D4 and the following dot arrays are formed similarly by using the nozzle arrays N1 and N2 in an alternate manner.

According to the process for forming an image explained above, even in the case when printing is conducted by using an inkjet recording apparatus of a line head system, an image having a desired image density can be formed while suppressing strike-through during printing, color bleeding between inks of different colors and occurrence of image pollution due to offset. Therefore, the process for forming an image of the present disclosure is preferably utilized in various inkjet recording apparatuses.

EXAMPLES

Hereinafter the present disclosure is further specifically explained by Examples. However, the present disclosure is not construed at all to be limited by Examples.

Preparation Example 1

In Preparation Example 1, the process for the preparation of inks a to l used in Examples and Comparative Examples are explained. For the preparation of the inks a to l, the following pigments were used as a black pigment (PK), a cyan pigment (PC), a yellow pigment (PY) and a magenta pigment (PM).

PK: Carbon Black MA7 (manufactured by Mitsubishi Chemical Corporation)

PC: C. I. Pigment Cyan 15:3 (manufactured by Dainichiseika Color & Chemicals Mfg. Co., Ltd.)

PY: C. I. Pigment Yellow 74 (manufactured by Dainichiseika Color & Chemicals Mfg. Co., Ltd.)

PM: C. I. Pigment Red 122 (manufactured by Dainichiseika Color & Chemicals Mfg. Co., Ltd.)

Furthermore, during the preparation of the pigment dispersion, a water-soluble resin that is a styrene-acrylic acid copolymer was used as a resin. The weight average molecular weights of the resin used in the preparation of the inks a to l are shown in Table 1 and Table 2. Furthermore, the acid value of the resin used in the preparation of the inks a to 1 was 150 mgKOH/g in all cases.

(Preparation of Pigment Dispersion)

The pigment, resin, ethylene glycol and pure water were put into a sand mill (manufactured by Yasukawa Seisakusho) at each of the ratios described in Table 1 and Table 2, and a dispersion treatment was conducted for 2 hours by using glass beads (diameter: 1.7 mm) having a mass of 1.5 times larger than the mass of the pigment dispersion to give a pigment dispersion.

(Preparation of Ink)

The inks a to l were each obtained by mixing the obtained pigment dispersion, 2-pyrrolidone, glycerin, triethylene glycol monobutyl ether, Olfine E1010 (a surfactant, an ethylene oxide additive of acetylenediol, manufactured by Nisshin Chemical Co., Ltd.) and pure water at each of the ratios described in Table 1 and Table 2 by a stirrer at a room temperature for 20 minutes, and filtering the mixture by a filter having a pore diameter of 5 μm. For the obtained inks, the particle size-change constants were measured according to the following process.

Process for Measuring Particle Size-Change Constant (Measurement of Mass Drying Rate)

About 250 ml of an ink was poured into a columnar container having a volume of 300 ml and an opening on the top, and the mass of the ink (initial mass) $W^1$ in the container was measured. The container of the ink was then put into a constant-temperature bath whose internal temperature had been set to 60° C., and the mass of the ink $W^2$ in the container was measured at every time that is optionally set. The mass drying rate of the ink calculated by the following formula was measured as needed, and the average particle diameters of the pigment included in the ink were measured according to the following process at the timepoints when the mass drying rate became 10% by mass, 20% by mass, 30% by mass and 40% by mass, respectively.

$$\text{Mass drying rate (\%)}=((W^1-W^2)/W^1)\times 100$$

(Measurement of Average Particle Diameter of Pigment)

The average particle diameters of the pigment included in the ink were measured at the timepoints when the mass drying rate became 10% by mass, 20% by mass, 30% by mass and 40% by mass, respectively. The average particle diameters were measured by using Zetasizer Nano ZS (manufactured by Malvern) at 25° C. The obtained median diameters (D50) of the pigment were used as average particle diameters.

(Process for Measuring Particle Size-Change Constant)

The values of the average particle diameters of the pigment included in the ink at the timepoints when the mass drying rates became 10% by mass, 20% by mass, 30% by mass and 40% by mass, respectively, were plotted, by using Microsoft (registered trademark) Excel (registered trademark) (manufactured by Microsoft), on an XY plane having a horizontal axis (X axis) that relates to the mass drying rates of the ink and a vertical axis (Y axis) that relates to the average particle diameters of the pigment included in the ink. When plotting the data, in the case when the mass drying rate was 10%, it was plotted as 0.10, and in the case when the mass drying rate was 40% by mass, it was plotted as 0.40. After plotting of the data, an approximate straight line was obtained by conducting linear-approximating based on the data in the range of the mass drying rates of 10, 20, 30 and 40% by mass. For the obtained approximate straight line, an approximate equation represented by Y=AX+B (A and B are constants) was acquired, and A as the gradient of the approximate straight line was considered as a particle size-change constant.

Figure 5:
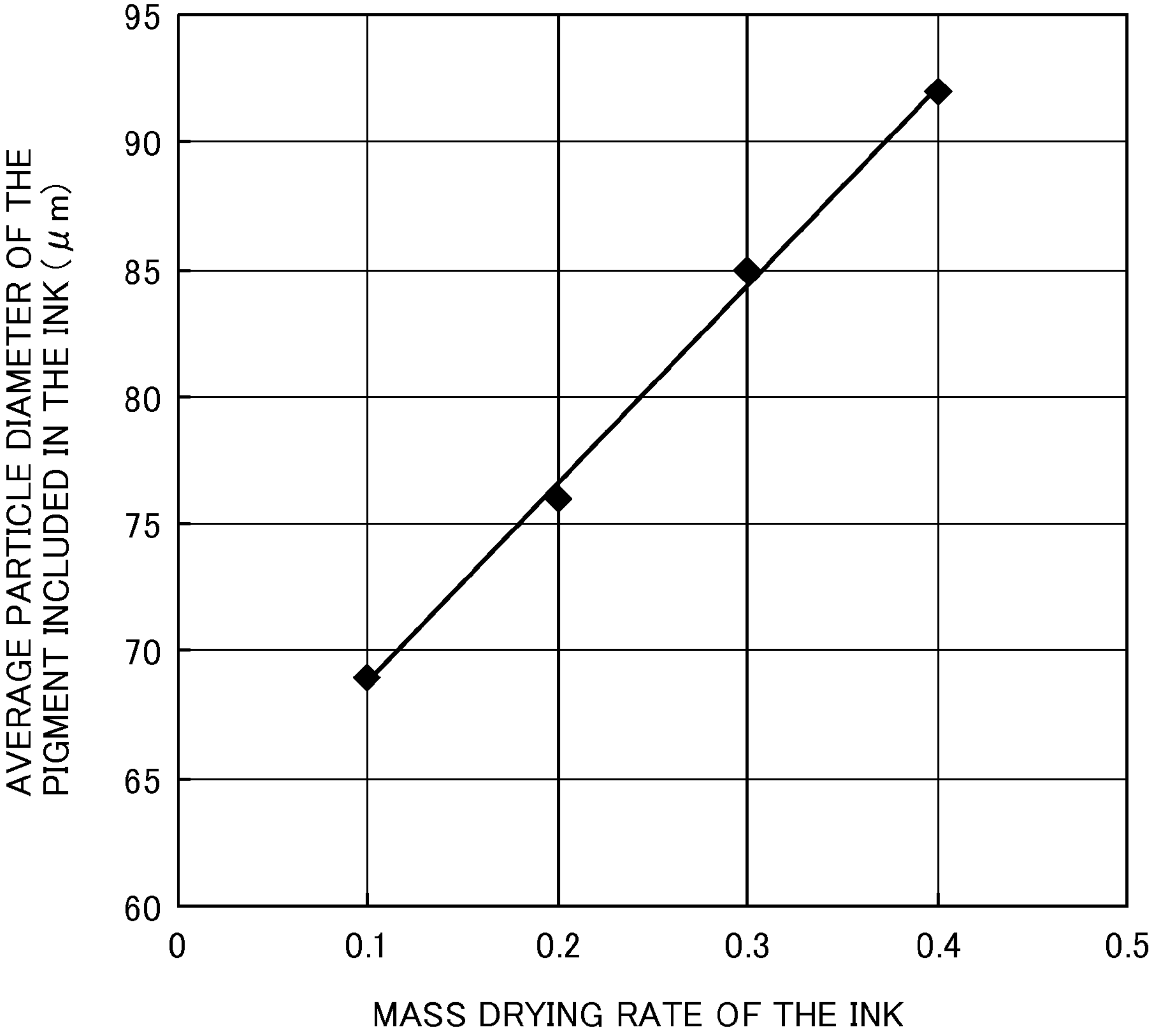

The average particle diameters (D50) of the pigment included in the inks at mass drying rates of 10, 20, 30 and 40% by mass, the equations of an approximate straight line and the particle size-change constants of the inks a to l are described in Table 1. Furthermore, as an example, a graph obtained by plotting the average particle diameters (D50) of the pigment included in the ink at mass drying rates of 10, 20, and 40% by mass on an XY plane having a horizontal axis (X axis) relating to the mass drying rates of the ink and a vertical axis (Y axis) relating to the average particle diameters of the pigment included in the ink, and an approximate straight line prepared on the graph for the ink a are shown in FIG. 5.

TABLE 1

| | Average particle diameter (μm) of pigment in each mass drying rate (% by mass) of ink<br>Mass drying rate | | | | | Particle size- |
|---|---|---|---|---|---|---|
| | 10% by mass | 20% by mass | 30% by mass | 40% by mass | Approximate equation | change constant |
| Ink a | 69 | 76 | 85 | 92 | Y = 78X + 61 | 78 |
| Ink b | 103 | 115 | 130 | 143 | Y = 135X + 89 | 135 |
| Ink c | 110 | 122 | 130 | 139 | Y = 95X + 101.5 | 95 |
| Ink d | 95 | 100 | 108 | 115 | Y = 68X + 87.5 | 68 |
| Ink e | 80 | 85 | 89 | 92 | Y = 40X + 76.5 | 40 |
| Ink f | 70 | 86 | 97 | 123 | Y = 170X + 51.5 | 170 |
| Ink g | 80 | 82 | 90 | 94 | Y = 50X + 74 | 50 |

TABLE 1-continued

| | Average particle diameter (μm) of pigment in each mass drying rate (% by mass) of ink<br>Mass drying rate | | | | | Particle size- |
|---|---|---|---|---|---|---|
| | 10% by mass | 20% by mass | 30% by mass | 40% by mass | Approximate equation | change constant |
| Ink h | 70 | 79 | 87 | 95 | Y = 83X + 62 | 83 |
| Ink i | 70 | 84 | 89 | 105 | Y = 110X + 59.5 | 110 |
| Ink j | 55 | 70 | 80 | 100 | Y = 145X + 40 | 145 |
| Ink k | 55 | 70 | 85 | 100 | Y = 150X + 40 | 150 |
| Ink l | 80 | 85 | 89 | 97 | Y = 55X + 74 | 55 |

TABLE 2

| | | Ink | | | | | |
|---|---|---|---|---|---|---|---|
| | | a | b | c | d | e | f |
| Pigment dispersion | Composition | | | | | | |
| | Pigment (kind/content (% by mass)) | PC/ 15 | PK/ 18 | PM/ 13 | PY/ 15 | PM/ 13 | PM/ 13 |
| | Resin (content (% by mass)) | 7 | 7 | 6 | 8 | 6 | 6 |
| | Ethylene glycool (content (% by mass)) | 10 | 10 | 9 | 12 | 9 | 9 |
| | Pure water (Content) | Balance | Balance | Balance | Balance | Balance | Balance |
| | Weight average molecular weight of resin | $5.5 \times 10^4$ | $18 \times 10^4$ | $7 \times 10^4$ | $3.5 \times 10^4$ | $2.5 \times 10^4$ | $30 \times 10^4$ |
| Ink | Composition | | | | | | |
| | Pigment dispersion (% by mass) | 20 | 20 | 25 | 25 | 25 | 25 |
| | 2-Pyrrolidone (% by mass) | 7 | 7 | 7 | 7 | 7 | 7 |
| | Glycerine (% by mass) | 10 | 10 | 10 | 10 | 10 | 10 |
| | Triethylene glycol monobutyl ether (% by mass) | 8 | 8 | 8 | 8 | 8 | 8 |
| | Olfine E1010 (% by mass) | 1 | 1 | 1 | 1 | 1 | 1 |
| | Pure Water (Content) | Balance | Balance | Balance | Balance | Balance | Balance |
| | Content of pigment in ink (% by mass) | 3 | 3.6 | 3.25 | 3.75 | 3.25 | 3.25 |
| | Particle size-change constant | 78 | 135 | 95 | 68 | 40 | 170 |

TABLE 3

| | | Ink | | | | | |
|---|---|---|---|---|---|---|---|
| | | g | h | i | j | k | l |
| Pigment dispersion | Composition | | | | | | |
| | Pigment (kind/content (% by mass)) | PY/ 15 | PC/ 15 | PM/ 13 | PK/ 18 | PC/ 15 | PK/ 18 |
| | Resin (content (% by mass)) | 8 | 7 | 6 | 7 | 7 | 7 |
| | Ethylene glycool (content (% by mass)) | 12 | 10 | 9 | 10 | 10 | 10 |

TABLE 3-continued

| | | Ink | | | | | |
|---|---|---|---|---|---|---|---|
| | | g | h | i | j | k | l |
| | Pure water (Content) | Balance | Balance | Balance | Balance | Balance | Balance |
| | Weight average molecular weight of resin | $3 \times 10^4$ | $6 \times 10^4$ | $9 \times 10^4$ | $20 \times 10^4$ | $5.5 \times 10^4$ | $5.5 \times 10^4$ |
| Ink | Composition | | | | | | |
| | Pigment dispersion (% by mass) | 25 | 20 | 25 | 20 | 20 | 20 |
| | 2-Pyrrolidone (% by mass) | 7 | 7 | 7 | 7 | 7 | 7 |
| | Glycerine (% by mass) | 10 | 10 | 10 | 10 | 20 | 20 |
| | Triethylene glycol monobutyl ether (% by mass) | 8 | 8 | 8 | 8 | 8 | 8 |
| | Olfine E1010 (% by mass) | 1 | 1 | 1 | 1 | 1 | 1 |
| | Pure Water (Content) | Balance | Balance | Balance | Balance | Balance | Balance |
| | Content of pigment in ink (% by mass) | 3.75 | 3 | 3.25 | 3.6 | 3 | 3.6 |
| | Particle size-change constant | 50 | 83 | 110 | 145 | 150 | 55 |

According to Table 2 and Table 3, it is understood, for example, from the comparison of the ink c, ink e and ink f, and the like, that the particle size-change constant of the ink can be increased by increasing the weight average molecular weight of the resin. Furthermore, according to the comparison of the ink a and ink k, it is understood that particle size-change constant of the ink can be increased by increasing the content of the moisturizing agent such as glycerin in the ink.

Examples 1 to 5 and Comparative Examples 1 to 10

An inkjet recording apparatus of a line head system including four recording heads was used, and arbitrary four kinds of inks were selected from the 12 kinds of inks obtained in Preparation Example 1. An image was formed by ejecting the selected four kinds of inks from the four recording heads in an arbitrary order, and strike-through, image density, image pollution due to offset and color bleeding were evaluated according to the following processes. The kinds of the inks as used and the orders of ejection of the inks in the respective Examples and respective Comparative Examples are shown in Table 4 and Table 5. Furthermore, the results of the evaluation of strike-through, image density, image pollution due to offset and color bleeding in Examples and Comparative Examples are shown in Table 4 and Table 5.

In the items of Ink in Table 4 and Table 5, the upper line shows the kinds of the inks, the middle line shows the particle size-change constants of the inks, and the bottom line shows the difference in particle size-change constant from the ink that had been ejected immediately before.

Evaluation of Strike-Through

As a test apparatus, an inkjet recording apparatus including four recording heads that were disposed in the direction vertical to the conveying direction of the recording medium so that the distance between the nozzles of the adjacent recording heads became 20 mm was used. Furthermore, as the recording heads, piezo-type heads (manufactured by Konica Minolta IJ) each having 512 of nozzles per one head, a resolution of 360 dpi (dpi is the number of dots per 2.54 cm), a droplet amount of 14 μl and a driving frequency of 12.8 kHz were used. The inks described in Table 4 and Table 5 were filled in the recording heads in each of the orders described in Table 4 and Table 5, and solid images were each printed while the recording medium was conveyed at a velocity of 350 mm/sec. As the recording medium, Xerox P paper (manufactured by Fuji Xerox Co., Ltd.) was used. Strike-through was evaluated by visual observations, and the case when strike-through was observed was judged as Bad, and the case when no strike-through was observed was judged as Good.

Evaluation of Image Density

A solid image was printed on a recording medium (Xerox P paper (manufactured by Fuji Xerox Co., Ltd.)) in a similar manner to that in the evaluation of strike-through, and the image density of the solid image was measured by using GRETAGMACBETH SPECTROSCAN SP50 (manufactured by Gretag) under conditions of a D50 light source and a view angle of 2°. An image density of 1.10 or less was evaluated as Very bad, and an image density of more than 1.10 and 1.20 or less was evaluated as Bad, and an image density of more than 1.20 was evaluated as Good.

Evaluation of Image Pollution Due to Offset

An inkjet recording apparatus in which a conveyer element (roller) for evaluating offset was disposed on the position 10 cm downstream of the recording head at the lowermost stream of the image forming apparatus used in the evaluation of strike-through was used as an image forming apparatus. A solid image was printed on a recording medium (Xerox P paper (manufactured by Fuji Xerox Co., Ltd.)) in a similar manner to that in the evaluation of strike-through, and image pollution caused on the unprinted part by rubbing of the solid image by the conveyer element was evaluated by visual observation. The criteria for the evaluation of image pollution due to offset are shown below.

Good: The image pollution of the unprinted part is not observed, or quite little image pollution was observed.

Bad: Slight image pollution was observed on the unprinted part.

Very bad: Significant image pollution was observed on the unprinted part.

Evaluation of Color Bleeding

A solid image was printed on a recording medium (Xerox P paper (manufactured by Fuji Xerox Co., Ltd.)) in a similar manner to that in the evaluation of strike-through. The end part of the solid image was observed by an optical microscope, and the presence or absence and degree of color bleeding were evaluated. The criteria for the evaluation of color bleeding are shown below.

A: Color bleeding is not observed.

B: Slight color bleeding is observed.

C: Weak color bleeding is observed. D: Strong color bleeding is observed.

TABLE 4

| | Ink | | | | Evaluation | | | |
|---|---|---|---|---|---|---|---|---|
| | 1st order | 2nd order | 3rd order | 4th order | Strike-through | Image density | Offset | Color bleeding |
| Example 1 | g<br>50 | h<br>83<br>33 | i<br>110<br>27 | j<br>145<br>35 | Good | 1.3/<br>Good | Good | A |
| Example 2 | g<br>50 | h<br>83<br>33 | c<br>95<br>12 | b<br>135<br>40 | Good | 1.3/<br>Good | Good | A |
| Example 3 | d<br>68 | c<br>95<br>27 | b<br>135<br>40 | k<br>150<br>15 | Good | 1.3/<br>Good | Good | A |
| Example 4 | d<br>68 | h<br>83<br>15 | i<br>110<br>27 | j<br>145<br>35 | Good | 1.3/<br>Good | Good | A |

TABLE 5

| | Ink | | | | Evaluation | | | |
|---|---|---|---|---|---|---|---|---|
| | 1st order | 2nd order | 3rd order | 4th order | Strike-through | Image density | Offset | Color bleeding |
| Comparative Example 1 | a<br>78 | c<br>95<br>17 | b<br>135<br>40 | f<br>170<br>35 | Good | 1.3/<br>Good | Bad | A |
| Comparative Example 2 | e<br>40 | c<br>95<br>55 | b<br>135<br>40 | d<br>68<br>−67 | Bad | 1.1/<br>Very bad | Good | B |
| Comparative Example 3 | k<br>150 | c<br>95<br>−55 | b<br>135<br>40 | d<br>68<br>−67 | Good | 1.2/<br>Bad | Very bad | D |
| Comparative Example 4 | d<br>68 | b<br>135<br>77 | c<br>95<br>−40 | a<br>78<br>−17 | Good | 1.1/<br>Very bad | Very bad | D |
| Comparative Example 5 | c<br>95 | b<br>135<br>40 | d<br>68<br>−67 | e<br>40<br>−28 | Good | 1.2/<br>Bad | Bad | D |
| Comparative Example 6 | c<br>95 | b<br>135<br>40 | d<br>68<br>−67 | k<br>150<br>82 | Good | 1.2/<br>Bad | Very bad | B |
| Comparative Example 7 | j<br>145 | i<br>110<br>−35 | h<br>83<br>−27 | g<br>50<br>−33 | Good | 1.1/<br>Very bad | Very bad | C |
| Comparative Example 8 | h<br>83 | g<br>50<br>−33 | i<br>110<br>60 | j<br>145<br>35 | Good | 1.1/<br>Very bad | Bad | B |
| Comparative Example 9 | i<br>110 | g<br>50<br>−60 | h<br>83<br>33 | j<br>145<br>62 | Good | 1.1/<br>Very bad | Very bad | D |

According to Table 4, it is understood that there was no problem in the strike-through, image density, image pollution due to offset and color bleeding in all of Examples 1 to 4 in which an image was formed by ejecting inks each having a particle size-change constant of 50 to 150 in the increasing order of the particle size-change constants.

On the other hand, according to Table 5, it is understood that image pollution due to offset occurs easily in Comparative Example 1 since the ink f having a particle size-change constant of more than 150 in which the particle diameter of the pigment included in the ink tends to be large and the liquid components included in the ink are difficult to penetrate into the recording medium is used as the ink for the fourth order.

In Comparative Example 2, an ink having a particle size-change constant of lower than 50 in which the particle diameter of the pigment is difficult to be increased after the ink has landed on the recording medium is ejected in the first order. Therefore, in Comparative Example 2, the pigment penetrates into the recording medium together with the liquid components included in the ink before the pigment is fixed on the surface of the recording medium, and thus strike-through occurs.

According to Table 5, it is understood that ink(s) each having a particle size-change constant that is smaller than that of the ink that has been ejected immediately before is/are ejected from at least one of the line heads in the second to fourth orders in all of Comparative Examples 2 to 9. Therefore, color bleeding occurred in all of Comparative Examples 2 to 9.

In Comparative Examples 3 to 9, image pollution due to offset occurs easily. It is true that image pollution due to offset tends to be suppressed by using inks each having a particle size-change constant of 50 to 150. However, even in the cases when an image is formed by ejecting inks each having a particle size-change constant within such range, in the case when an ink having a relatively high particle size-change constant is ejected in the early order, the particle diameter of the pigment is increased on the surface of the recording medium or the inside of the recording medium, thereby the penetration of the inks that are ejected in the next and following orders into the recording medium is blocked easily.

In Comparative Examples 2 to 9, it is difficult to form an image having a desired image density. In the case when strike-through occurs, since the pigment penetrates into the inside of the recording medium, the amount of the pigment remaining on the surface of the recording medium is decreased. Therefore, occurrence of strike-through leads to decrease in the image density of the formed image. Furthermore, in the case when image pollution due to offset occurs, the pigment on the surface layer of the formed image transfers to the roller of the ejection part. Therefore, occurrence of image pollution due to offset causes decrease in the image density of the formed image. Furthermore, in the case when color bleeding occurs, the amount of the pigment remaining on the image part on the surface of the recording medium is decreased due to the exudation of the ink. Therefore, color bleeding leads to decrease in the image density of the formed image. Therefore, in Comparative Examples 2 to 9, it is difficult to form an image having a desired image density due to multiple factors including strike-through, image pollution due to offset and color bleeding.

What is claimed is:

1. A process for forming an image by using an inkjet recording apparatus using two or more kinds of inks each containing a pigment dispersion containing a pigment and a resin, an organic solvent and water comprising: step of plotting values of the average particle diameters of the pigment contained in the ink on an XY plane comprising an X axis relating to the mass drying rates (%) in a range of 10 to 40% and a Y axis relating to the average particle diameters (μm) of the pigment;

step of obtaining a particle size-change constant as the gradient of an approximate straight line obtained by linear-approximating the plotted values;

step of filling the two or more types of inks, into two or more recording heads arranged facing a recording medium that is conveyed inside of the inkjet recording apparatus and in parallel in a conveying direction of the recording medium, so that a particle size-change constant of ink filled into a recording head is larger for a recording head positioned more on a downstream side in the conveying direction of the recording medium; and step of forming an image by ejecting the two or more types of the inks from the two or more recording heads towards the recording medium;

wherein each ink has a particle size-change constant of 50 μm/% to 150 μm/%.

2. The process for forming an image according to claim 1, wherein the resin has weight average molecular weight of 30,000 to 200,000.

3. The process for forming an image according to claim 1, wherein, for particle size-change constants of two types of inks filled into two adjacent recording heads among the two or more recording heads, the particle size-change constant of ink filled into a recording head positioned on a downstream in the conveying direction of the recording medium is 10 μm/% to 50 μm/% larger than the particle size-change constant of ink filled into a recording head positioned on an upstream side in the conveying direction of the recording medium.

4. The process for forming an image according to claim 1, wherein the inkjet recording apparatus comprises a line head system and provides a printing velocity of 100 ppm or more in the case when the printing is conducted by conveying a recording medium of A4 portrait size.

* * * * *